Patented Jan. 15, 1946

UNITED STATES PATENT OFFICE 2,393,222

RUBBERLESS FLEXIBLE COMPOSITIONS AND PROCESSES

Adolph Pischel, New York, N. Y., and Harry F. Stowe, Rutherford, N. J., assignors to Eagle Pencil Company, New York, N. Y., a corporation of Delaware No Drawing. Application April 30, 1942, Serial No. 441,232

13 Claims. (Cl. 106—171)

The present invention is concerned especially with processes, compositions and products of the type that are useful in the stationery field and that have certain supposedly unique characteristics of rubber, but are yet entirely devoid of either refined or even of crude rubber.

An object of the invention is to provide compositions for fabricating articles such as rubber erasers, pen grips and the like, the characteristics of which may be predetermined, so that to the layman they are practically indistinguishable in appearance and behavior, from the familiar corresponding articles which have rubber as a substantial ingredient thereof.

Another object is to provide a process and composition for producing a rubberless eraser which will have any desired degree of hardness or flexibility, which in use will approximate the efficacy of any type of conventional eraser and which will have long shelf life and not be subject to crumbling with age or swelling or disintegrating under moisture.

Another object is to provide a process for preparing such compositions at low cost, for characteristics which may be predetermined to meet the requirements of use, and which process may be carried out by the use of the conventional equipment commonly employed in the manufacture of such articles of conventional rubber mix.

The invention in one aspect thereof is based essentially upon the discovery that a water soluble binder of the type that retains some flexibility upon drying will serve for bonding together particles of factice of any of a wide variety of types, and that the resultant composition or article of manufacture, despite said water-soluble ingredient is effectively resistant to humidity.

In the rubberless eraser application, the material which imparts the erasing or "noodling" quality is factice, usually white factice, of known composition. Ordinarily the white factice is of rapeseed oil free from moisture and vulcanized with sulphur monochloride at controlled temperature. The rapeseed oil may be replaced in whole or in part with castor oil, corn oil, cottonseed oil, linseed oil or the like. The factice may be admixed with suitable abrasive, filler, coloring matter and other ingredients as required.

The water soluble binder used according to the present invention to retain the particles in a unitary block or plug may be of any of a number of water soluble gums or glues that remain flexible or plastic when dry. It is however preferred to use cellulose derivative, wholly, or if desired, in large part of etherized cellulose of water soluble type, preferably methylated ether of cellulose, although as an alternative cellulose acetate may be used to advantage. The water soluble etherized cellulose binder desirably is between five and ten per cent of the weight of the entire mass, and preferably between 5 and 7.5 per cent thereof. By reason of the spongy character of the small factice particles, the binder becomes intimately interbonded therewith and the resultant structure while flexible as required is not brittle or subject to ready disintegration.

The binder of cellulose derivative, while water soluble as such, has been found to be effectively resistant to humidity in the finished article and indeed erasers subjected for several days to a warm atmosphere of 100 per cent humidity were found to remain completely intact. Moreover, the methylated ether of cellulose retains its flexibility in the completed eraser under normal room temperatures and does not stiffen by aging.

In the process of preparing one specific rubberless eraser composition, five parts of methyl ether of cellulose are soaked in about 25 parts of water and left to stand for a sufficient period of time to provide a gel-like mass. To this is added about 90 parts of white factice of high quality and of desired degree of vulcanization and the mass is mixed in a kneading machine. Thereupon five parts of finely divided pumice are added with suitable coloring material, such as iron oxide or antimony sulphide or suitable dyes, and the mixing is continued for a short period of time. The resultant mass is then passed through a rolling mill, desirably a conventional rubber mill and this treatment is continued with or without the application of heat, until the water content of the mass is down to about 16–17 per cent, at which time the mass has the desired consistency for the final extrusion into the shape desired. After extrusion and drying the lengths are cut up into the finished erasers.

While tri-methyl ether of cellulose is usually preferred as the binder, because it is completely soluble in water, it will be understood that ethers of cellulose that are only partly methylated are useful for the purpose, as are also mixed ethers, provided they are at least partly and preferably largely methylated, such as for instance, dimethylethyl ether of cellulose. For certain purposes, such mixed ethers are preferred, because the relatively insoluble non-methyl constituents are present as stringy particles, which serve to strengthen the eraser, without rendering it stiff, yet such stringy particles wear flush with the erasing surface in use. If desired, other water soluble binder materials such as gum tragacanth or fish glue, may wholly or partly replace the ether of cellulose, but such other ingredients tend somewhat to stiffen and to render less efficacious the erasing action of the mass.

It will be understood that the proportions of the ingredients may be varied, and that other ingredients may be added where desired, such as fillers, coloring matter, fibrous matter and plasticizers, all in accordance with practices and for purposes well understood by manufacturers, for producing various types and grades of conventional rubber erasers.

While pumice is ordinarily preferred as the abrasive, where an abrasive is used at all, it will be understood that for specialized effects, asbestos, calcium carbonate, ethyl silicate, Portland cement and the like or combinations of some or all of these materials, may wholly or partly replace the pumice.

Where filler is used, any of a wide variety of substances are suitable such as clay, lithopone, barytes or heavy calcined magnesia, or combinations of some or all of these materials.

Any of a wide variety of softeners or plasticizers may be added where desired, such as cotton seed, linseed, castor oil or mineral oil.

The invention in another aspect is based on the discovery that the factice base itself may be rendered suitable to serve as the binder for the composition, so that the distinct binder may be wholly or if desired, partly dispensed with.

To this end, the factice made from rapeseed, corn oil or the like is vulcanized, preferably with sulphur monochloride only to a partial degree, so that it is not entirely dry. It may be admixed, if desired, with a smaller proportion say 25 per cent by weight of a considerably drier and more completely vulcanized factice. A small proportion of sulphur is added and after admixture with the desired fillers, and if desired with a small proportion of water soluble binder, the composition is molded or shaped and the vulcanization is completed under steam.

For the manufacture of rubber-like articles such as pen grips that are not suitable for erasers, it is possible and preferred to use factice of such character that the same will itself act as the binder for incorporating considerable filler therewith, sufficient sulphur being added for completing the vulcanization without the addition of any extraneous binding material.

In one composition for such purpose, 100 parts of factice, desirably of rapeseed oil or the like incompletely vulcanized with sulphur monochloride and which is only partly dry is admixed with at least 200 parts of filler such as whiting, heavy calcined magnesia or the like, or mixtures of the same, and if desired, in the order of 20 parts of a plasticizer such as linseed oil or castor oil is added. When the vulcanization is completed with 10 to 15 parts of sulphur, the filler becomes securely bonded with the factice, in a structure relatively homogeneous to the eye, which has the required flexibility and which is completely resistant to water.

It will be understood that in some or all of the combinations set forth, certain ingredients may be used that perform a double purpose. For instance, casein glue, Portland cement or ethyl silicate may be used to perform the combined function in whole or in part of a binder and an abrasive. Aluminum hydrate may be used to perform the combined function in whole or in part of a filler and an abrasive.

As many changes could be made in the above composition and process and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. A rubber-like article of manufacture comprising a base of factice and a flexible water-soluble binder therefor of cellulose derivative, said composition having the property of effective resistance to humidity and to disintegration.

2. The combination recited in claim 1 in which the binder includes largely methyl ether of cellulose.

3. The combination recited in claim 1 in which the binder includes gum tragacanth.

4. A flexible eraser devoid of rubber, comprising a mixture of white factice and a binder of water-soluble etherized cellulose.

5. An eraser composition comprising the product resulting from the vulcanization with sulphur mono-chloride of vegetable oil selected from the group consisting of rapeseed oil, corn oil, castor oil, cottonseed oil and linseed oil intimately admixed with abrasive, the composition being bound together by a binder of water-soluble methyl ether of cellulose.

6. A rubberless eraser, comprising comminuted white factice and abrasive held together by a binder of methyl ether of cellulose.

7. A flexible eraser devoid of rubber, comprising a mixture of white factice and a binder of etherized cellulose at least partially methylated, said binder being by weight between 5 and 10 percent of the total mass.

8. An eraser devoid of rubber, comprising a mixture of powdered factice, filler and pigment having a binder of etherized cellulose at least partially methylated.

9. An eraser devoid of rubber, comprising a mixture of small particles of factice, abrasive and pigment and having a binder of etherized cellulose at least partially methylated, said binder being in the order of 5 to 7.5 per cent by weight of the entire mass.

10. The process of preparing rubberless erasers, which consists in soaking water-soluble binder in a great excess of water, admixing the same with white factice, kneading the same, then admixing the same with abrasive, rolling the same under pressure until the water content has been considerably reduced, extruding the material through a die and then drying the same.

11. The process of preparing rubberless erasers, which consists in soaking methyl ether of cellulose in five parts of water to produce a gel, adding thereto in the order of 15 to 20 parts of white factice, kneading the mix, adding a small proportion of pumice thereto, continuing the mixing, rolling the product under pressure until the water content has been reduced to in the neighborhood of 16–17 per cent, extruding the mix to the desired shape, drying and cutting the resultant product.

12. The process of preparing rubberless eraser stock comprising the admixture of partly vulcanzed incompletely dried factice, of more completely vulcanized and dried factice, and of water soluble binder and vulcanizing the same with sulphur.

13. A flexible eraser devoid of rubber comprising a mixture of white factice and a binder of mixed etherized cellulose including methylated water-soluble constituents and non-methylated insoluble stringy constituents.

ADOLPH PISCHEL.
HARRY F. STOWE.